United States Patent Office 3,746,664
Patented July 17, 1973

3,746,664
URETHANE FOAMS WITH REDUCED SMOKE LEVELS AND IMPROVED FLAME SPREAD
Herman P. Doerge, Oakmont, and Marco Wismer, Gibsonia, Pa., assignors to PPG Industries, Inc., Pittsburgh, Pa.
No Drawing. Filed July 2, 1971, Ser. No. 159,534
The portion of the term of the patent subsequent to Feb. 1, 1989, has been disclaimed
Int. Cl. C08g 22/44
U.S. Cl. 260—2.5 AM                             13 Claims

ABSTRACT OF THE DISCLOSURE

This invention relates to polyurethane foams having reduced smoke levels and improved flame spread characteristics. The invention comprises incorporating particulate fumaric acid or into a polyurethane foam formulation wherein the polyol employed is a polyether polyol.

STATE OF THE ART

Increasing attention has been placed on the amount of smoke generated from fire-retardant polyurethane foams. It is evident that even a polyurethane foam having a low flame spread may create a hazard if the smoke released when the foam is in contact with the flame is sufficient to trap occupants in an enclosed space by obscuring their vision or hampering their ability to breath. Methods have been developed for measuring this amount of smoke evolved, for example, see Journal of Cellular Plastics, January 1967, pages 41–43. Likewise, the Underwriters Laboratory has developed tests and ratings for measuring smoke evolution. For example, ASTM–E84 tunnel tests, as well as UL–723. In addition, flame spread is of significant importance when evaluating the properties of a fire retardant foam. Flame spread is the tendency of flame to spread along a flat surface when a foam is exposed to a flame source. Again, this property is measured by ASTM–E84 (UL–723).

The incorporation of certain aromatic acids into foam compositions in order to increase the fire-retardancy of polyurethane foam has been described in the art. In each such case, the aromatic acid has been reacted into the reactive components of the foam prior to the foaming step. For example, see U.S. Pats. Nos. 3,479,305 and 3,300,420.

In U.S. application Ser. No. 119,952, filed Mar. 1, 1971, and likewise application Ser. No. 873,638, filed Nov. 3, 1969, now U.S. Pat. 3,639,307 there are described incorporation of isophthalic acid and fumaric acid into a fire-retardant foam formulation containing phosphorus compound which contributes to fire-retardancy to provide fire-retardant polyurethane foams having reduced smoke levels and also improved flame spread.

DESCRIPTION OF THE INVENTION

It has now been found that fumaric acid produces reduced levels of smoke and improved flame spread characteristics when incorporated into polyurethane foams produced from polyether polyols, even in the absence of a phosphorus fire retardant. When fumaric acid is incorporated in a substantially unreacted, particulate, finely-divided form, there are produced polyurethane foams having reduced amounts of smoke generated by the foam as well as improved flame spread characteristics when the foam is burned. These characteristics are achieved without substantially detracting from the foam properties. This is surprising since most acids of their class are either ineffective in reducing smoke generation or improving flame spread or significantly degrade foam properties. The amount of particulate acid employed in the foams of this invention is that amount which is an effective smoke-diminishing amount. Generally about 2 percent to about 40 percent by weight of the total composition is employed. Preferably, about 10 to about 25 percent by weight of the total composition is employed.

The polyurethane foams of this invention having reduced smoke generation and improved flame spread are virtually any organic polyether polyol derived foam formulation formed by reacting an organic polyisocyanate with an organic polyether polyol.

The polyether polyol may be virutally any polyether polyol employed as a urethane reactant. Preferably the polyether polyol is an organic compound or resin having an isocyanate equivalent of between 70 to about 280. The presently preferred group of polyether polyols have hydroxyl values between about 200 and about 800, such as the reaction product of a polyhydroxyl compound containing 3 to 8 hydroxyl group and an alkylene oxide containing 2 to 4 carbon atoms. Most preferably, the polyether polyol consists essentially of carbon, hydrogen, and oxygen.

Polyether polyols can be prepared by oxyalkylation of aliphatic triols such as hexane triol, trimethylolethane, trimethylolpropane, glycerol, and the like. These polyether polyols may be used in minor or major quantities in the foam formulations of this invention. It is preferred, however, that additional polyether polyols be more than trifunctional and that the trifunctional polyether polyols be used in relatively minor quantities. The trifunctional polyether polyols most useful in the preparation of rigid polyurethane foams have a hydroxyl value in excess of about 200 and preferably should have a hydroxyl value in excess of about 300.

Tetrafunctional polyether polyols and polyether polyols of higher functionality are prepared by the reaction of an alkylene oxide, such as ethylene oxide, propylene oxide or butylene oxide, with a polyol having 4 or more available hydroxyl groups. Typical tetrafunctional and higher functional polyether polyols are prepared by the oxyalkylation of polyols such as the following: pentaerythritol, sucrose, 2,2,6,6 - tetrakis(hydroxymethyl)cyclohexanol, glucose, sorbitol, mannitol, degraded starches, degraded cellulose, diglycerol, α-methyl glucoside and the like. When such polyether polyols are utilized in the novel rigid polyurethane foams of this invention, they should have a hydroxyl number in excess of about 200 and preferably in excess of about 250, with the best results ordinarily being achieved from those polyether polyols having hydroxyl numbers in excess of about 300.

Another useful class of polyether polyols which can be employed are the trialkanolamines which by reaction with alkylene oxides form adducts of suitable molecular weight. The alkylene oxide adducts which can be employed are preferably those wherein the oxyalkylene moieties thereof have 2 to 4 carbon atoms.

Another useful class of polyether polyols which can be employed are the alkylene oxide adducts of mono- and polyamines and also ammonia. These are termed "aminic polyols."

The mono- and polyamines are preferably reacted with alkylene oxides which have 2 to 4 carbon atoms, for example, ethylene oxide; 1,2-epoxypropane, the epoxybutanes; and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine 1,2-, 1,3- 1,4-, 1,5- and 1,6-hexanediamine phenylenediamines, toluenediamine naphthalenediamines, and the like. Among the compounds of the above groups which are of particular interest are among others, N,N, N',N'-tetrakis(2-hydroxyethyl)ethylenediamine; N,N,N', N'-tetrakis(2 - hydroxypropyl)-ethylenediamine; N,N,N',N'-pentakis(2-hydroxypropyl)diethylenetriamine; phenyldiisopropanolamine and higher alkylene oxide adducts of aniline, and the like. Others which deserve particular mention are the alkylene oxide adducts of aniline or substituted aniline/formaldehyde condensation products.

It is obvious that where the polyether polyol contains halogens such as chlorine or bromine or nitrogen, since these elements contribute to fire retardancy, in some cases these polyols are highly desirable.

Organic polyisocyanates which are reacted with the polyether polyol to form polyurethane foams include the following:

Toluene diisocyanate
Chlorophenyl-2,4-diisocyanate
Ethylene diisocyanate
1,4-tetramethylene diisocyanate
Para-phenylene diisocyanate
Hexamethylene diisocyanate and the like. While the above diisocyanates may be reacted with the polyether polyol to form foams, it is preferred to form prepolymers of said diisocyanates when they are to be used in rigid foam formulations.

When it is desired to form polyurethane foams directly from an organic polyisocyanate and the polyether polyol without first preparing a prepolymer, it is preferred that polynuclear polyisocyanates of the following type be included:

Diphenyl diisocyanate
Triphenyl diisocyanate
3,3'-dimethyl-4,4'-biphenylene diisocyanate
3,3'-dimethoxy-4,4'-biphenylene diisocyanate
Polymethylene polyphenyl isocyanate
Diphenylmethane-4,4'-diisocyanate
Triphenylmethane triisocyanate
1,5-naphthalene diisocyanate
3,3'-dimethyldiphenylmethane-4,4'-diisocyanate and the like. Of the preferred polyisocyanates, it has been found that the best results have been obtained when the polymeric polyisocyanates having a functionality greater than 2.0 are utilized. Exemplary polymeric polyisocyanates include the following:

Crude diphenylmethane-4,4'-diisocyanate, commonly referred to as crude MDI having a functionality of about 2.5 to 2.6. Furthermore, although solid organic polyisocyanates can be utilized in the instant invention by melting them prior to reaction with other foam-forming ingredients, it is preferred that liquid organic polyisocyanates be utilized.

Another organic polyisocyanate particularly useful is crude tolylene diisocyanate, commonly referred to as crude TDI, containing about 85 percent TDI and about 15 percent polymeric isocyanate and having a functionality of about 2.1.

Polymethylene polyphenyl isocyanate, rfeerred to as PAPI, having an isocyanate functionality greater than about 2.4, has been found to be particularly useful.

Polyurethane foams are prepared by reacting approximately one equivalent of polyether polyol with one equivalent of an organic polyisocyanate. It is frequently desirable to include a small amount of suitable urethane catalyst and there is also ordinarily included in foam formulations suitable emulsifiers and blowing agents.

The relative amount of organic isocyanate utilized in polyurethane foam formulations is susceptible to variation over a substantial range. Usually the isocyanate component is employed in an amount which provides approximately one reactive isocyanato group for each reactive hydrogen of the other compound, which is conventionally a polyol, polyamine or similar reactive hydrogen-containing material. However, some of the organic polyisocyanates tend to evaporate and it may be desirable to compensate for this loss. A range of about one-half equivalent to about two equivalents of organic polyisocyanate per equivalent of polyol component in the final material is ordinarily used, but smaller or larger amounts can be utilized with good results.

To promote the polyurethane linkage reactions in the final curing of the polyurethane resins, catalysts are usually required. These include tertiary amines of hydroxyl amines, organic salts of tin, and the like. The following constitutes a partial list of such catalysts:

Tetramethylethylenediamine (anhydrous) (TMEDA)
Tetramethyl guanadine (TMG)
Tetramethyl-1,3-butanediamine (TMBDA)
Triethylenediamine of the formula:

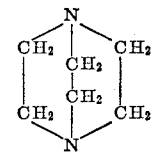

Dimethylethanolamine (DMEA)
Tin esters, such as:

Stannous oleate
Stannous octoate
Dibutyl tin dilaurate
Dibutyl tin diacetate and the like.

Many other catalysts may be substituted for those listed above, if desired. The amount of catalyst used may be in a range of about 0.05 percent to about 5 percent or more by weight based upon the total of the polyols employed. Mixtures of the above and/or other catalysts may also be utilized.

To impart a foamed or cellular structure to the blended polyol-polyisocyanate mixture, a suitable gassing agent or system of gassing agents must be added or produced in situ. The liquid but relatively volatile halocarbons, such as the following perhalocarbons containing 1, 2 or event up to 4 carbon atoms, are especially desirable for the purpose. These include the following:

$CCl_3F$    $CHCl_2F$
$CCl_2F_2$  $CClF_3$
$C_2Cl_2F_4$  $CHClF_2$

The halocarbons having one and two carbon atoms are preferred, and of these, trichloromonofluoromethane and dichlorodifluoromethane are particularly useful in commercial preparations. There are added as liquids in quantities of about 10 percent or less to about 20 percent or more, by weight of the total resin to the blended polyol-polyisocyanate mixtures, or to one or more components thereof, and are substantially volatilized in the liquid mixture to effect cellulation. Subsequently, the mixture cures to a hardened, cellular state.

Although the halocarbons are especially desirable as blowing agents when exceptional insulative properties are desired, other blowing agents, such as water, carbon dioxide, and the like, can be utilized in this invention.

In order to obtain relatively uniform distribution of the various components of the liquid system and to achieve proper cellulation, an emulsifier and/or surfactant may be incorporated into the mixture. These materials are physical in their effect and are not always necessary, especially if denser foams are desired. Many hundreds of these are available as commercial products. Some of these are listed in the publication DETERGENTS AND EMULSIFIERS—UP TO DATE, published by John W. McCutcheon, Inc., 475 Fifth Ave., New York, N.Y.

Examples of surfactants which may be used include the so-called Pluronics, which have been described as being condensates of ethylene oxide with a hydrophobic base formed by condensing propylene oxide with propylene glycol. These are of a molecular weight in a range of about 2000 to about 8000 and are ascribed the structure:

Another class of surfactants comprises the so-called Tetronics, which are formed by the addition of propylene oxide to ethylene diamine, followed by the addition of ethylene oxide. These compounds have been ascribed the structure:

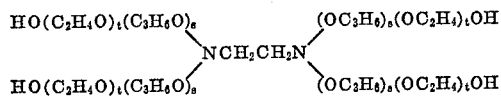

Another valuable class of surfactants comprises the so-called Tweens, which are described as the monoesters of higher fatty acids, represented by lauric acid, stearic acid and oleic acid, and polyoxyethylene sorbitan.

Another of the more satisfactory surfactants which has been found very effectively to maintain the cell structure in the foaming and curing of polyurethane resins comprises soluble, liquid derivatives of the silicones. One such product is of the approximate structure:

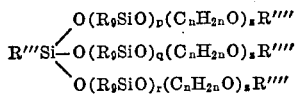

in which R''' and R'''' are monovalent hydrocarbon radicals, while $R_9$ is a divalent hydrocarbon radical; $p$, $q$ and $r$ are integers equal to at least 1 and may be considerably higher, e.g., 2, 3, 4, 5, 6, or a higher number up to about 20; $n$ is a whole number from about 2 to about 4; and $z$ is an integer equal to at least 5 and may be higher, e.g., 6, 7, 8, 9, 10 or even higher, up to about 25. One such material is sold as Dow-Corning 199. Still another highly useful silicon base surfactant comprises the so-called silicon L-521, represented by the following formula:

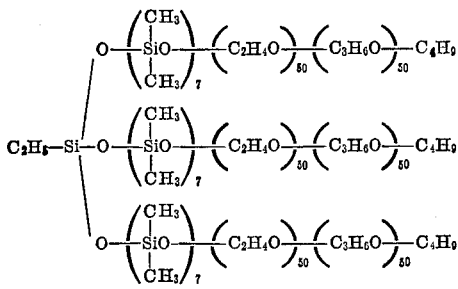

Other surfactants, especially the liquid or soluble nonionic ones, are also useful. The surfactants may be employed in amounts within a range of about 0.1 to about 3 percent by weight based upon the mixture of polyol component and the organic polyisocyanate component. In relatively dense foams, for example those weighing about 5 or 6 pounds and upward per cubic foot, the surfactants may be omitted entirely.

The invention is further described in conjunction with the following examples, which are to be considered illustrative rather than limiting. All parts and percentages in the examples and throughout this specification are by weight unless otherwise stated.

EXAMPLE

The polyol employed in this example was a sucrose polyether polyol as described in U.S. Pats. Nos. 3,085,085, 3,153,002 and 3,222,357 and elsewhere, comprising one mole of sucrose, 0.4 mole of diethylenetriamine, 14.5 moles of propylene oxide and 4 moles of ethylene oxide with a hydroxyl value of 470.

The isocyanate employed was NCO-20, a p,p'-diphenylmethane diisocyanate with a functionality of 2.5 to 2.6 and an NCO equivalent of 133.

One-shot foams were formulated as follows: All components other than the isocyanate were blended, then the isocyanate was added and the mixture foamed:

|  | Foam A | Foam B |
| --- | --- | --- |
| NCO-20 (parts) | 90.0 | 90.0 |
| Fumaric acid (parts) | | 32.0 |
| Polyol (above) (parts) | 63.6 | 63.6 |
| Silicone surfactant (parts) | 1.0 | 1.0 |
| Dibutyl tin diacetate (parts) | 0.3 | 0.4 |
| FCl₃C (parts) | 29.1 | 35.0 |
| Mix/cream/set (seconds) | 8/25/41 | 8/20/37 |
| Foam quality | Good | Good |
| Density (lbs./ft.³) | 1.94 | 1.93 |
| ASTM D-1692 | (a) | (b) |
| NBS smoke chamber Dm [c] | 121 | 86 |

[a] Burned completely.
[b] Self-extinguishing.
[c] Dm = Maximum value of specific optical density.

NOTE.—Test for smoke generation on burning described in D. Gross et al. "Method for Measuring Smoke from Burning Materials," Symposium on Fire Test Methods-Restraint and Smoke, 1966, ASTM STP-4222, American Society for Testing Materials (1967), p. 166.

Other isocyanates and polyether polyols such as those described hereinabove can be substituted for those of the example. Likewise, the adjuvants such as cellulating agents, emulsifiers, catalysts, etc., may be chosen from those known in the art.

According to the provisions of the patent statutes, there are described above the invention and what are now considered its best embodiments; however, within the scope of the appended claims, it is understood that the invention can be practiced otherwise than as specifically described.

We claim:
1. A polyurethane foam formed from a mixture comprising the following chemical entities:
   (A) an organic polyisocyanate which is a polymeric polyisocyanate having a functionality greater than 2;
   (B) a polyether polyol;
   (C) an effective smoke and flame spread reducing amount of particulate fumaric acid; and
   (D) a cellulating agent, the resultant polyurethane foam containing said particulate acid in a substantially unreacted, particulate form.

2. A foam as in claim 1 wherein (A) has an isocyanate equivalent of about 70 to about 280; and (C) is present in an amount of about 2 percent to about 40 percent by weight on the total composition.

3. A foam as in claim 1 wherein (B) comprises a polyether polyol which is the reaction product of a polyhydroxyl compound containing 3 to 8 hydroxyl groups and an alkylene oxide containing 2 to 4 carbon atoms per molecule.

4. A foam as in claim 3 wherein (B) has a hydroxyl value of about 200 to about 800; and (C) is present in an amount of about 2 percent to about 40 percent of the total composition.

5. A foam as in claim 4 wherein the cellulating agent (D) is a halocarbon.

6. A foam as in claim 4 wherein the polyol comprises a sucrose polyether polyol.

7. A foam as in claim 6 wherein the cellulating agent (D) is a halocarbon.

8. A polyurethane foam as in claim 1 formed from a mixture comprising:
   (A) an organic polyisocyanate;
   (B) a polyether polyol having an isocyanate equivalent of between about 70 and about 280;
   (C) about 10 percent to about 25 percent of fumaric acid based on the total composition;
   (D) a cellulating agent; and
   (E) an emulsifier for the mixture.

9. A foam as in claim 8 wherein (B) comprises a polyether polyol which is the reaction product of a polyhydroxyl compound containing 3 to 8 hydroxyl groups and an alkylene oxide containing 2 to 4 carbon atoms per molecule.

10. A foam as in claim 9 wherein (B) has a hydroxyl value above about 250.

11. A foam as in claim 10 wherein the cellulating agent (D) is a halocarbon.

12. A foam as in claim 10 wherein the polyol comprises a sucrose polyether polyol.

13. A foam as in claim 12 wherein the cellulating agent (D) is a halocarbon.

References Cited

UNITED STATES PATENTS 3,563,908  2/1971  Koenig _____ 260—2.5
3,684,754  8/1972  Barie _____ 260—2.5 AM

FOREIGN PATENTS 1,137,263  12/1968  Great Britain.
6906244    10/1969  Netherlands.

DONALD E. CZAJA, Primary Examiner

C. W. IVY, Assistant Examiner

U.S. Cl. X.R.

260—2.5 AJ, 2.5 AP, 2.5 AQ, 2.5 AS